(12) United States Patent
Joung et al.

(10) Patent No.: US 9,398,466 B1
(45) Date of Patent: Jul. 19, 2016

(54) SYSTEM FOR TESTING MOBILE HANDOVER

(71) Applicant: INNOWIRELESS CO., LTD., Gyeonggi-do (KR)

(72) Inventors: Jin Soup Joung, Gyeonggi-do (KR); Jong Min Kim, Gyeonggi-do (KR); Chang Bok Yang, Gyeonggi-do (KR); Myung Gu Kang, Gyeonggi-do (KR)

(73) Assignee: INNOWIRELESS CO., LTD. (KR)

( * ) Notice: Subject to any disclaimer, the term of this patent is extended or adjusted under 35 U.S.C. 154(b) by 0 days.

(21) Appl. No.: 14/720,512

(22) Filed: May 22, 2015

(30) Foreign Application Priority Data

May 13, 2015 (KR) .......................... 10-2015-0066573

(51) Int. Cl.
*H04W 16/22* (2009.01)
*H04W 24/06* (2009.01)
*H04W 36/24* (2009.01)

(52) U.S. Cl.
CPC .............. *H04W 16/22* (2013.01); *H04W 24/06* (2013.01); *H04W 36/24* (2013.01)

(58) Field of Classification Search
CPC ..... H04W 24/06; H04W 36/08; H04W 24/08; H04W 36/00; H04W 24/04; H04W 24/10; H04W 36/0016; H04W 36/0033; H04W 36/30; H04W 36/165; H04W 88/08; H04W 16/22; H04W 24/00; H04W 24/02; H04W 36/0022
See application file for complete search history.

(56) References Cited

U.S. PATENT DOCUMENTS

| | | | |
|---|---|---|---|
| 7,797,132 B1* | 9/2010 | Lele ........................ | G01C 25/00 702/181 |
| 8,665,730 B2* | 3/2014 | Ozaki ................... | H04W 24/06 370/241 |
| 9,014,643 B2* | 4/2015 | Aoki ..................... | H04W 24/06 375/224 |
| 9,281,929 B2* | 3/2016 | Earnshaw ............. | H04W 72/02 |
| 2008/0151763 A1* | 6/2008 | Lee ......................... | H04L 43/50 370/241 |
| 2013/0005384 A1* | 1/2013 | Tanaka ................... | H04M 1/24 455/517 |
| 2013/0085737 A1* | 4/2013 | Hashimoto ............ | H04B 7/155 703/13 |
| 2014/0128003 A1* | 5/2014 | Takahashi ............. | H04W 24/06 455/67.7 |

FOREIGN PATENT DOCUMENTS

| | | | |
|---|---|---|---|
| JP | 2009-302937 A | | 12/2009 |
| JP | 2012114627 A | * | 6/2012 |
| KR | 10-1999-0051711 A | | 7/1999 |
| KR | 10-2002-0069498 A | | 9/2002 |
| KR | 20020091390 A | | 12/2002 |
| KR | 20020091600 A | | 12/2002 |
| KR | 20070105063 A | | 10/2007 |
| KR | 10-0790333 B1 | | 12/2007 |

\* cited by examiner

*Primary Examiner* — Hirdepal Singh
(74) *Attorney, Agent, or Firm* — Kaplan Breyer Schwarz & Ottesen LLP (57) ABSTRACT

Provided is a system for testing mobile handover which makes it possible to test a handover operation on a mobile side by providing an actual base station with a radio wave environment for causing mobile devices to move. The system is intended to test whether or not a handover operation of a mobile present in the service areas of at least three base stations is performed without interrupting service while the mobile moves from the service area of a currently connected base station to another spot.

9 Claims, 12 Drawing Sheets

SYSTEM FOR TESTING MOBILE HANDOVER

CROSS-REFERENCE TO RELATED APPLICATION

This application claims priority to and the benefit of Korean Patent Application No. 10-2015-0066573, filed on May 13, 2015, the disclosure of which is incorporated herein by reference in its entirety.

FIELD OF THE INVENTION

The present invention relates to a system for testing mobile handover, and more particularly, to a system for testing mobile handover which makes it possible to test a handover operation on a mobile side by providing an actual base station with a radio wave environment for causing mobile devices to move.

BACKGROUND OF THE INVENTION

Figure 1:
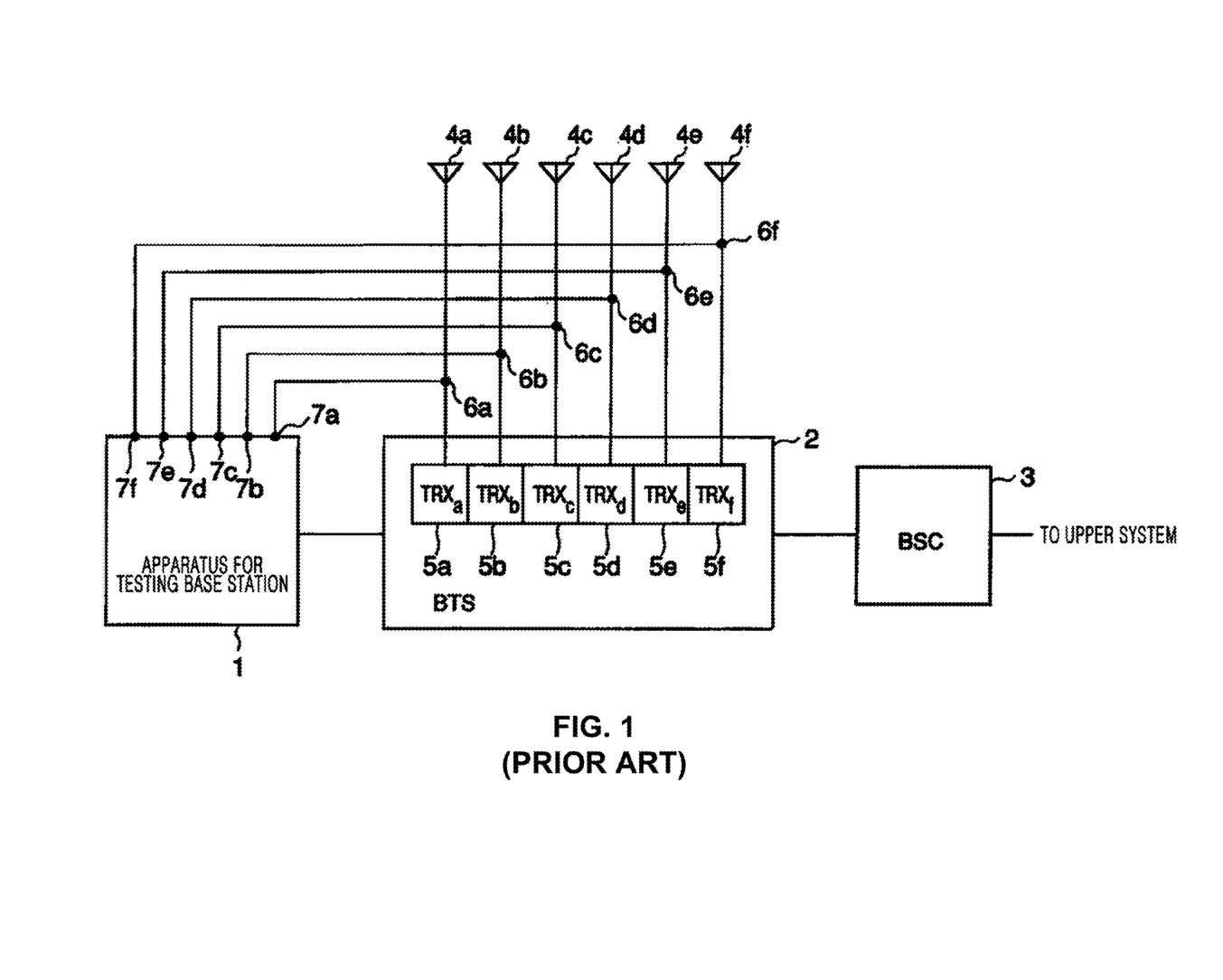
FIG. 1 shows a constitution of an apparatus for testing a base station in a code division multiple access (CDMA) communication system according to related art.

As related art of a system for testing mobile handover according to an exemplary embodiment of the present invention, Korean Patent Application Publication No. 10-2002-0069498 A discloses an apparatus and method for testing a base station in a code division multiple access (CDMA) communication system shown in FIG. 1. According to this technology, in a base station testing apparatus to be used to test an active base transceiver station (BTS) of a CDMA system, a plurality of preset attenuators are arranged for respective sectors of a service area assigned to the BTS, and are included to correspond to a plurality of sector transmission and reception units (TRXs) of the BTS and to simulate a soft handover test of the active BTS between a test sector and an adjacent sector. To this end, each of the preset attenuators is configured so that at least three attenuation values, such as 0 dB, −3 dB, and −50 dB, can be implemented and are selected one by one under the control of a switching controller. In such a structure, the preset attenuator of a test sector is set to 0 dB, and an adjacent preset attenuator and other preset attenuators are set to −3 dB and −50 dB, respectively. When the attenuation values are controlled in this way, a soft handover test of the active BTS is simulated.

Figure 2:
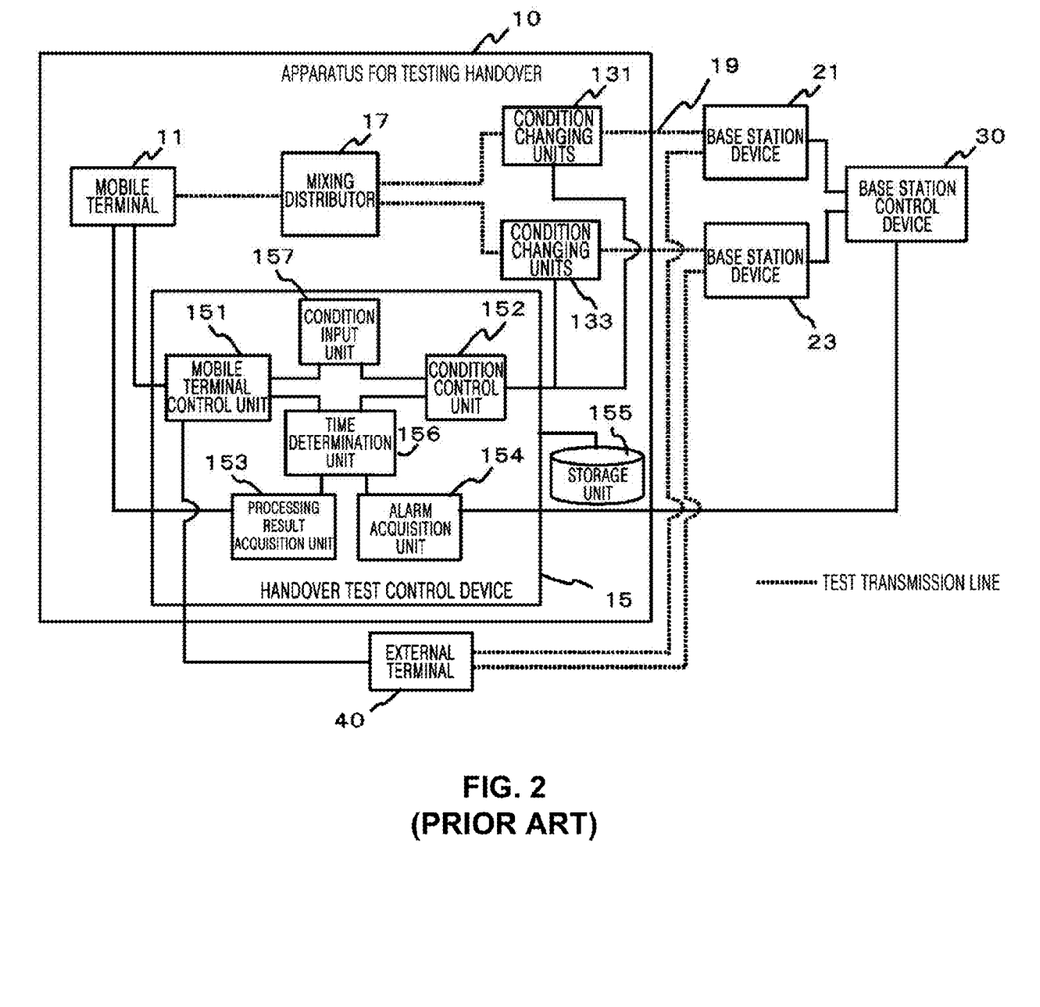
FIG. 2 shows a constitution of an apparatus for testing handover according to other related art.
Figure 3:
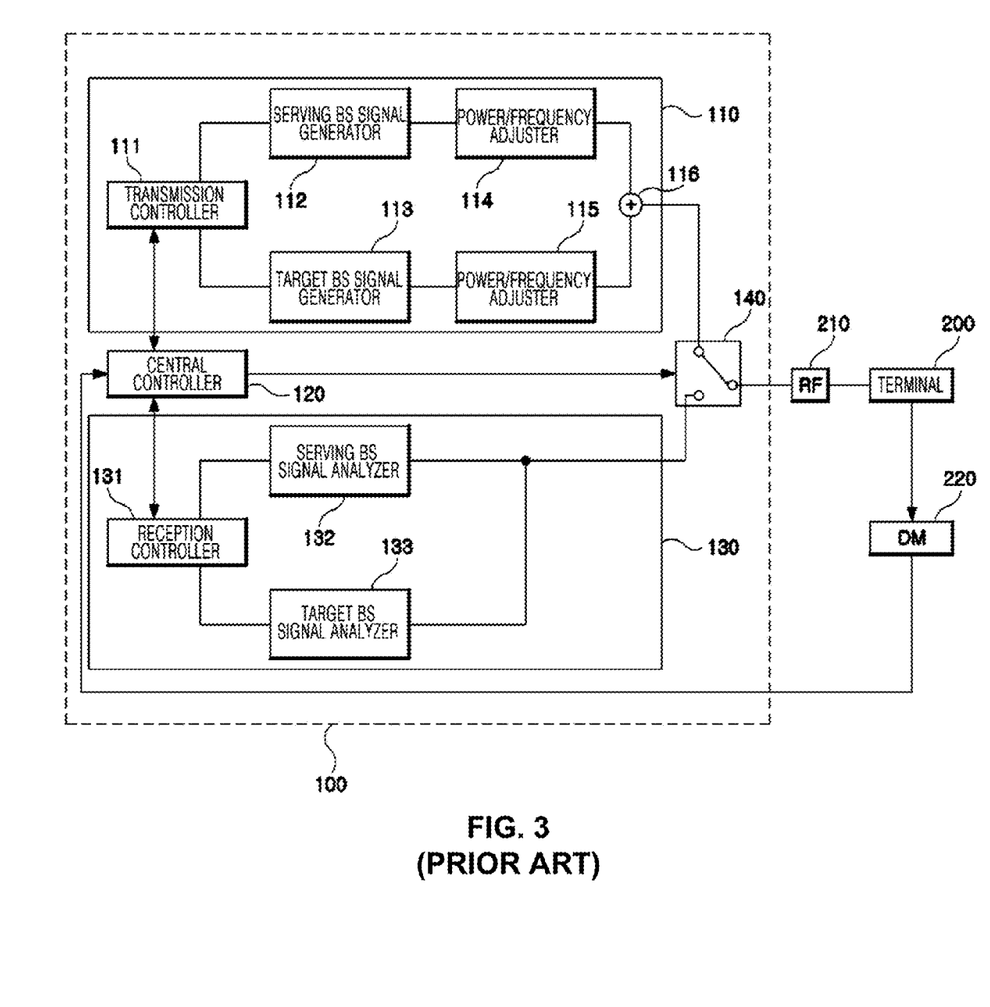
FIG. 3 shows a constitution of a portable Internet measuring device with a handover test function according to other related art.

As other related art of an exemplary embodiment of the present invention, Japanese Patent Application Publication No. 2009-302937 discloses an apparatus and method for testing handover shown in FIG. 2. The apparatus includes condition changing units 131 and 133 for changing a communication state of a test transmission line 19 connecting a mobile terminal 11 to base station devices 21 and 23, a condition control unit 152 for setting the communication state of the test transmission line 19 to a communication state for the condition changing units 131 and 133, and a processing result acquisition unit 153 for the mobile terminal 11 to acquire results of handover processing performed by the mobile terminal 11.

As other related art of an exemplary embodiment of the present invention, Korean Patent No. 10-0790333 B1 discloses a portable Internet measuring device with a handover test function. The portable Internet measuring device includes: a transmission unit configured to encode a variety of downlink (DL) signals of a serving base station or a target base station by a preamble indices including cell identifiers (IDs), which have been allocated in advance with different codes, combine the encoded DL signals, and transmit the combined signal to a portable Internet terminal in connection with a handover test; a reception unit configured to receive a variety of uplink (UL) signals from the portable Internet terminal and decode the received UL signals with the cell IDs of the serving base station or the target base station in connection with the handover test; a switching unit configured to switch every DL period and UL period of each frame and selectively connect one of the transmission unit and the reception unit to the portable Internet terminal; and a central control unit configured to generate a variety of media access control (MAC) messages to be transmitted to the portable Internet terminal through the transmission unit, analyze an MAC message related to the handover test and received through the reception unit, and control the switching operation of the switching unit in connection with the handover test.

This work was supported by Industrial Core Technology Development Project for next generation communication network of MSIP/KEIT, Republic of Korea. [10041628, Radio Unit (RU) Development for Multi-Band Multi-RAT base station based on a micro RF unit module that is applicable to multi-cell environment for next generation mobile communication service]

RELATED DOCUMENTS (Patent Literature 1) KR10-2002-0069498 A
(Patent Literature 2) JP2009-302937 A
(Patent Literature 3) KR10-0790333 B1
(Patent Literature 4) KR10-0419889 B1
(Patent Literature 5) KR10-0425990 B1
(Patent Literature 6) KR10-0782949 B1
(Patent Literature 7) KR10-1999-0051711 A

SUMMARY OF THE INVENTION

The present invention is directed to providing a system for testing mobile handover which makes it possible to test a handover operation on a mobile side by providing an actual base station with a radio wave environment for causing mobile devices to move.

The present invention is also directed to providing a system for testing mobile handover which makes it possible to test a handover operation of a mobile in homogeneous network and heterogeneous network environments.

According to an aspect of the present invention, there is provided a system for testing mobile handover, the system including: a plurality of virtual base stations including at least three base stations and configured to set uplink (UL) and downlink (DL) attenuation for the base stations; a plurality of combiners configured to combine UL and DL radio frequency (RF) signals for the plurality of virtual base stations; a plurality of mobile gain controllers configured to be connected to the plurality of combiners and control UL and DL-specific gain or attenuation dependent on environments of a plurality of test-target mobiles; and the plurality of test-target mobiles having UL and DL channels separately connected to the plurality of gain controllers.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

The above objectives, features, and advantages will be more apparent from the following description associated with the accompanying drawings. When it is determined that detailed description related to known art may unnecessarily obscure the gist of the present invention, the detailed description will be omitted.

Figure 4:
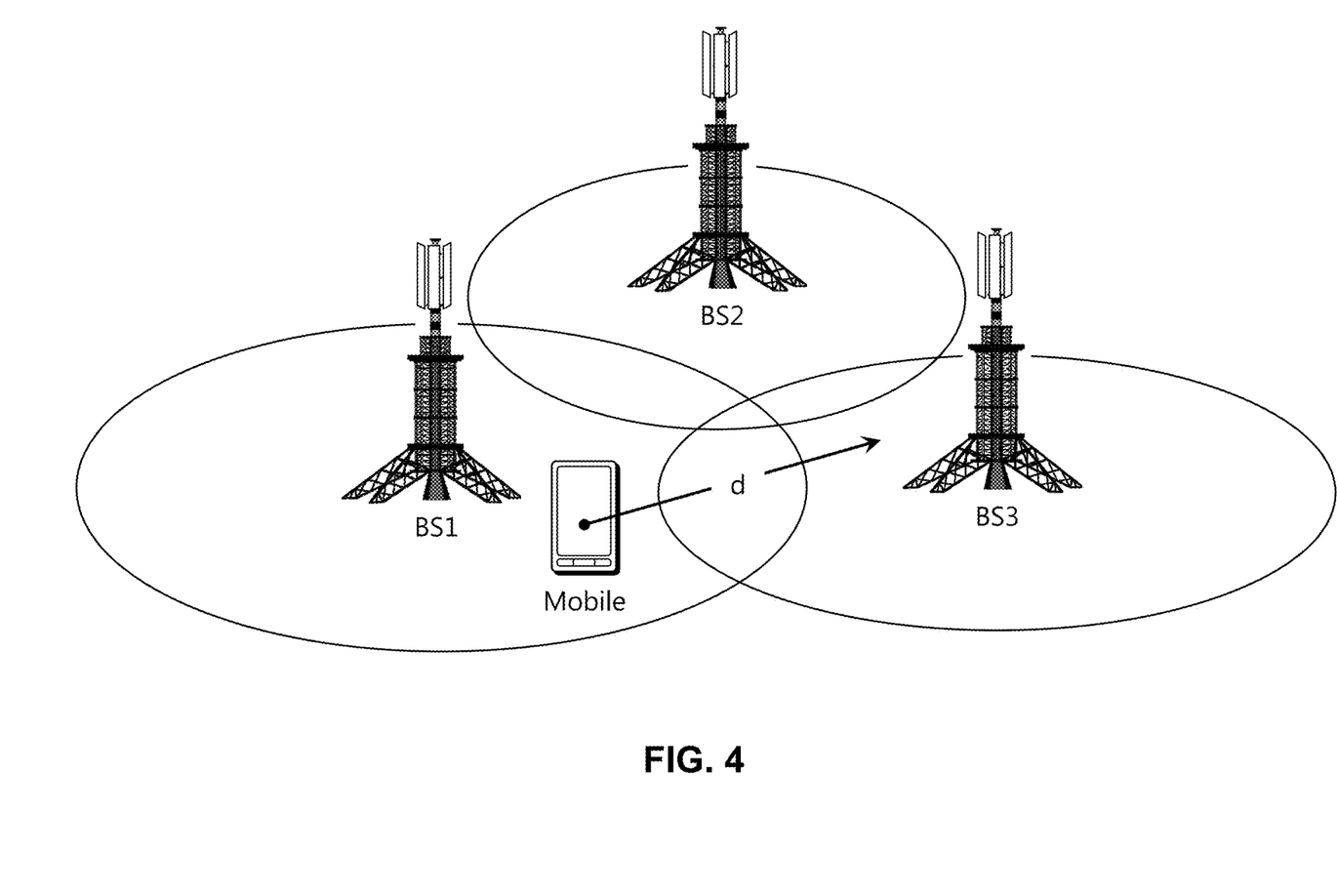
FIG. 4 shows a basic model of a system for testing mobile handover according to an exemplary embodiment of the present invention.

FIG. 4 shows a basic model of a system for testing mobile handover according to an exemplary embodiment of the present invention. The system for testing mobile handover according to the exemplary embodiment of the present invention is intended to test whether or not the service connection of a mobile present in the service areas of at least three base stations BS1, BS2, and BS3, that is, a handover operation on a mobile side, is achieved without interrupting service while the mobile moves by d from the service area of the currently connected base station BS1 to another spot. To this end, the exemplary embodiment of the present invention provides the system for testing mobile handover which makes it possible to test the handover operation on a mobile side by providing an actual base station with a radio wave environment for causing mobile devices to move.

Figure 5:
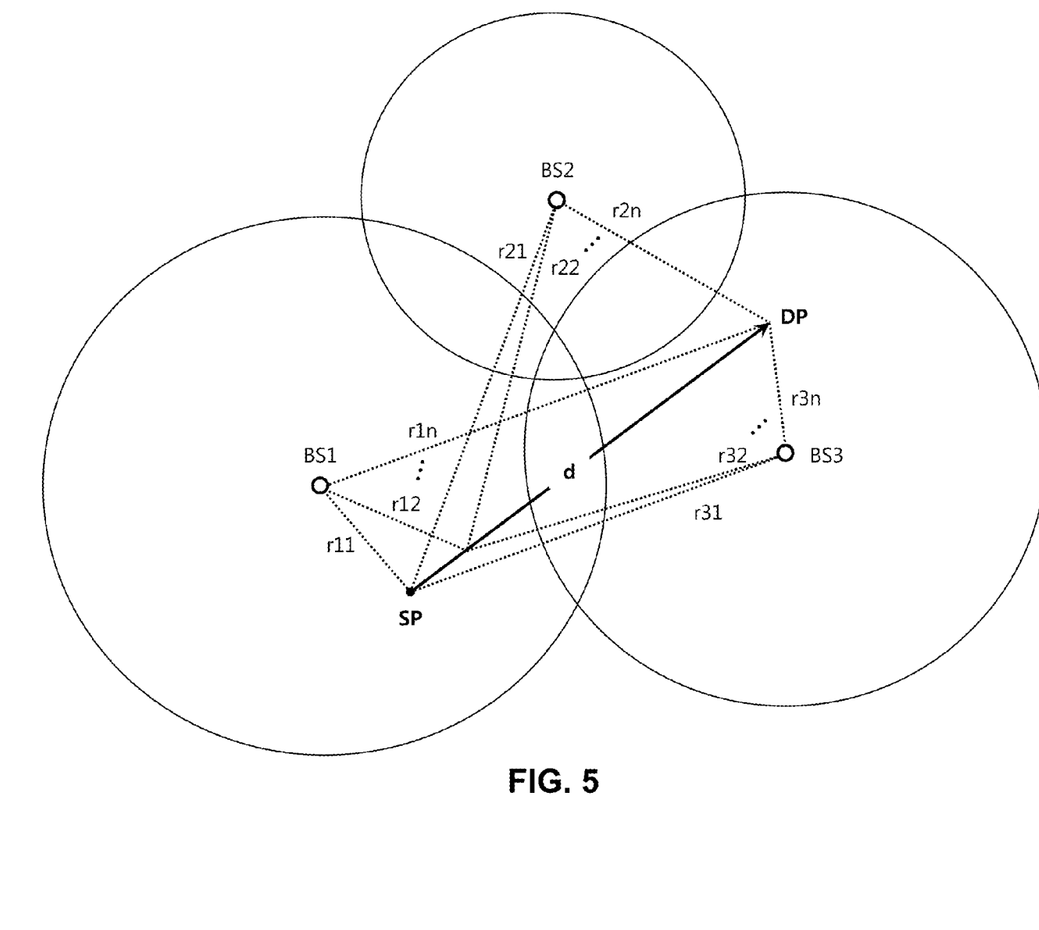
FIG. 5 shows a scenario of the system for testing mobile handover according to the exemplary embodiment of the present invention.

FIG. 5 shows a scenario of the system for testing mobile handover according to the exemplary embodiment of the present invention. To test a handover operation of a mobile present in a service area of the three base stations BS1 to BS3 during a process in which the mobile moves by d from a starting point SP in the service area of the currently connected base station BS1 to a destination point DP, the system for testing mobile handover according to the exemplary embodiment of the present invention divides a movement path d of the mobile into equal distances, and provides a radio wave environment for the at least three base stations BS1 to BS3 according to a location in the movement path d. According to a scenario for the test, when the locations of the three base stations BS1 to BS3 on a map, the starting point SP, and the destination point DP are determined, the distance from the base station to the mobile is calculated according to a location on the movement path d, and it is possible to provide a radio wave environment which is in inverse proportion to the square of the distance. As the mobile moves from the starting point SP to the destination point DP in the drawing, the distances from the base stations BS1 to BS3 to the mobile respectively change to r11, r12, . . . , and r1n, r21, r22, . . . , and r2n, and r31, r32, . . . , and r3n according to the location on the movement path d. Therefore, the system for testing mobile handover according to the exemplary embodiment of the present invention makes it possible to test a handover operation on a mobile side by providing radio frequency (RF) signals uplinked and downlinked between the mobile and each base station according to the location on the movement path d when the locations of the base stations BS1 to BS3 on the map, the starting point SP, and the destination point DP are determined.

Figure 6:
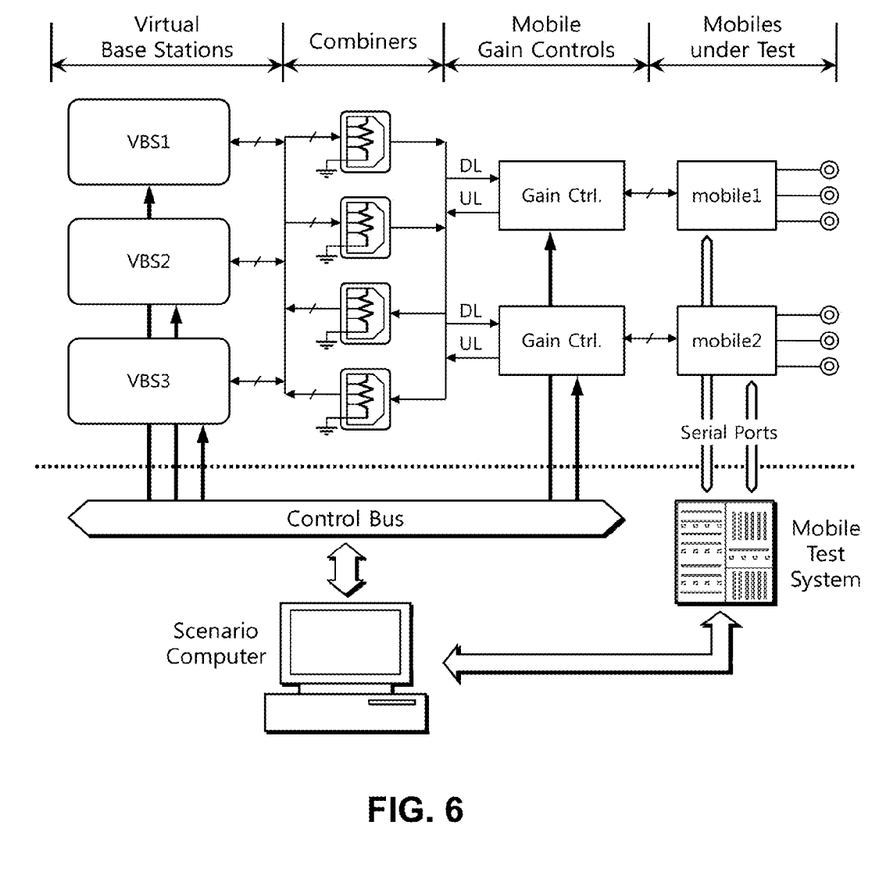
FIG. 6 shows a basic constitution of a system for testing mobile handover according to an exemplary embodiment of the present invention.

FIG. 6 shows a basic constitution of a system for testing mobile handover according to an exemplary embodiment of the present invention. The system for testing mobile handover according to the exemplary embodiment of the present invention is configured to test a handover operation on a plurality of mobile sides with respect to three or more base stations, but a configuration for testing a handover operation of two mobiles with respect to three base stations will be described as an example to clarify characteristics of the present invention.

The system for testing mobile handover according to the exemplary embodiment of the present invention includes: a plurality of virtual base stations VBS1, VBS2, and VBS3 including at least three base stations and configured to set uplink (UL) and downlink (DL) attenuation for the base stations; a plurality of combiners which combine UL and DL RF signals for the plurality of virtual base stations; a plurality of mobile gain controllers which are connected to the plurality of combiners and control UL and DL-specific gain or attenuation dependent on environments of a plurality of test-target mobiles; and the plurality of test-target mobiles having UL and DL channels separately connected to the plurality of gain controllers. Here, all RF signals between the elements are connected through coaxial cables to prevent mutual interference and the introduction of external noise and to provide conditions close to an actual base station environment.

Setting of UL and DL attenuation by the plurality of virtual base stations VBS1, VBS2, and VBS3 and control of UL and DL-specific gain or attenuation by the mobile gain controllers are performed by a scenario computer connected through a control bus. Also, the plurality of test-target mobiles are connected to a mobile test system through a serial bus, and the mobile test system monitors base station connection states of the plurality of test-target mobiles and provides the scenario computer with handover information including the identifiers (IDs) of currently connected base stations. Therefore, the scenario computer controls UL RF signals received from the test-target mobiles, DL RF signals transmitted to the test-target mobiles, and UL and DL-specific gain or attenuation of the test-target mobiles using the plurality of mobile gain controllers according to locations in movement paths d based on the locations of the plurality of virtual base stations VBS1 to VBS3 on a map and starting points SPs and destination points DPs of the plurality of test-target mobiles, and may be provided with resultant base station connection states of the plurality of test-target mobiles by the mobile test system and test a handover operation on a mobile side.

Figure 7:
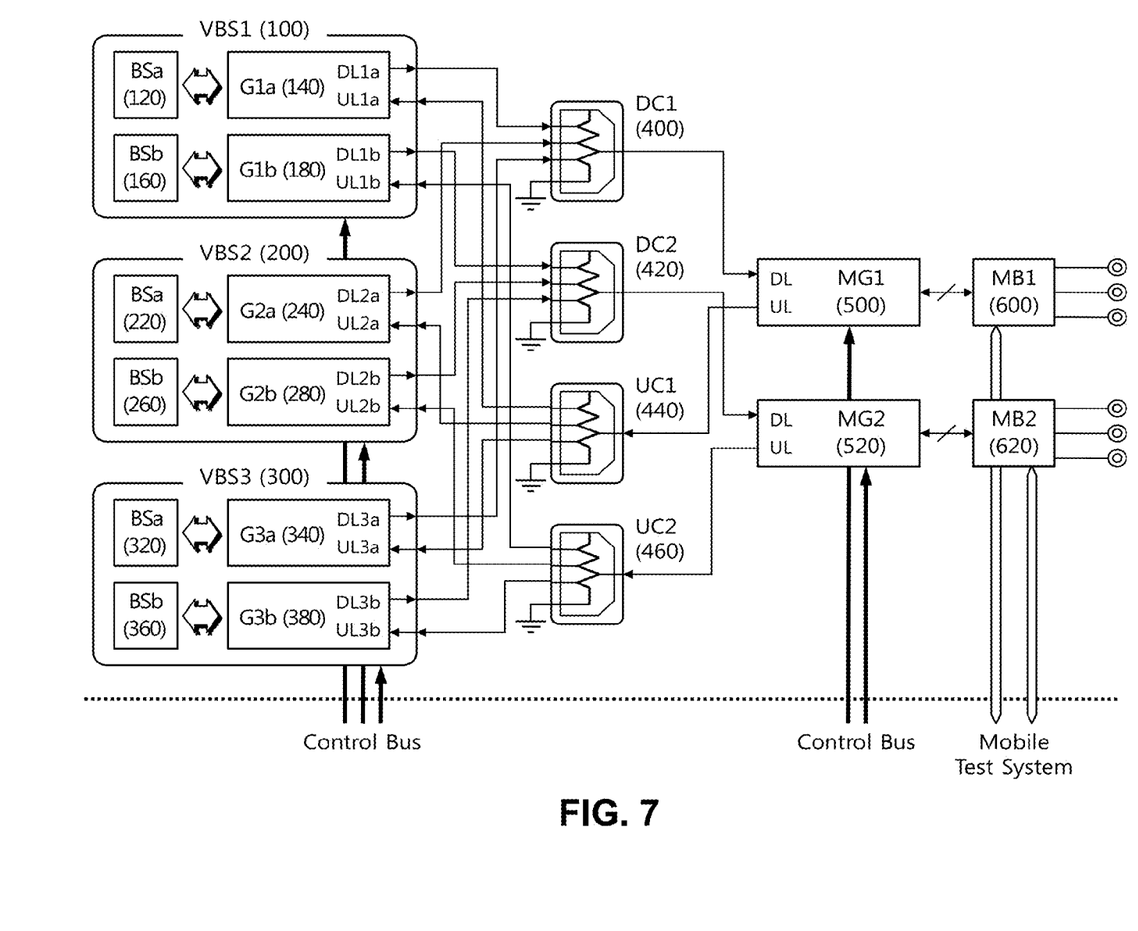
FIG. 7 shows a detailed constitution of the system for testing mobile handover according to the exemplary embodiment of the present invention.

FIG. 7 shows a detailed constitution of the system for testing mobile handover according to the exemplary embodiment of the present invention. As current mobile communication networks, each country has a plurality of different types of networks. Accordingly, mobiles are manufactured to support different types of version-specific networks, such as second generation (2G) Global System for Mobile Communication (GSM), third generation (3G) Universal Mobile Telecommunications System (UMTS) (wideband code division multiple access (W-CDMA)), and fourth generation (4G) Long Term Evolution (LTE). Therefore, a system for a mobile test is required to perform a handover test by providing at least two different types of network environments.

As shown in FIG. 7, the system for testing mobile handover according to the exemplary embodiment of the present invention includes: a plurality of virtual base stations VBS1 100, VBS2 200, and VBS3 300; combiners DC1 400 and DC2 420 which combine DL RF signals for the virtual base stations; combiners UC1 440 and UC2 460 which combine UL RF signals; a plurality of mobile gain controllers MG1 500 and MG2 520 which are connected to the plurality of combiners and control UL and DL-specific gain or attenuation dependent on environments of mobiles MB1 600 and MB2 620 to be tested; and the plurality of test-target mobiles MB1 600 and MB2 620 having UL and DL channels separately connected to the plurality of mobile gain controllers MG1 500 and MG2 520. All RF signals between the elements are connected through coaxial cables to prevent mutual interference and the introduction of external noise and to provide almost the same conditions as an actual environment.

Setting of UL and DL attenuation by the plurality of virtual base stations VBS1 100 to VBS3 300 and control of UL and DL-specific gain or attenuation by the mobile gain controllers MG1 500 and MG2 520 are performed by the scenario computer connected through the control bus. Also, the plurality of test-target mobiles MB1 600 and MB2 620 are connected to the mobile test system through the serial bus, and the mobile test system monitors base station connection states of the plurality of test-target mobiles MB1 600 and MB2 620 and provides the scenario computer with handover information including the IDs of currently connected base stations.

The plurality of virtual base stations VBS1 100 to VBS3 300 include a plurality of different types of network base station devices, and a base station gain controller which sets UL and DL attenuation is connected and provided to each base station device.

Accordingly, the virtual base station VBS1 100 includes a base station device BSa 120, a base station gain controller G1a 140 which is connected to the base station device BSa 120 and sets UL and DL attenuation, a base station device BSb 160, and a base station gain controller G1b 180 which is connected to the base station device BSb 160 and sets UL and DL attenuation. UL and DL RF signals of the base station gain controllers G1a 140 and G1b 180 are connected to the combiners DC1 400 and DC2 420 which combine DL RF signals using coaxial cables and the combiners UC1 440 and UC2 460 which combine UL RF signals using coaxial cables.

Also, the virtual base station VBS2 200 includes a base station device BSa 220, a base station gain controller G2a 240 which is connected to the base station device BSa 220 and sets UL and DL attenuation, a base station device BSb 260, and a base station gain controller G2b 280 which is connected to the base station device BSb 260 and sets UL and DL attenuation. UL and DL RF signals of the base station gain controllers G2a 240 and G2b 280 are connected to the combiners DC1 400 and DC2 420 which combine DL RF signals using coaxial cables and the combiners UC1 440 and UC2 460 which combine UL RF signals using coaxial cables.

Likewise, the virtual base station VBS3 300 includes a base station device BSa 320, a base station gain controller G3a 340 which is connected to the base station device BSa 320 and sets UL and DL attenuation, a base station device BSb 360, and a base station gain controller G3b 380 which is connected to the base station device BSb 360 and sets UL and DL attenuation. UL and DL RF signals of the base station gain controllers G3a 340 and G3b 380 are connected to the combiners DC1 400 and DC2 420 which combine DL RF signals using coaxial cables and the combiners UC1 440 and UC2 460 which combine UL RF signals using coaxial cables.

Here, base station devices in the plurality of virtual base stations VBS1 100 to VBS3 300 may be configured for a plurality of different types of networks according to the virtual base stations based on actual network conditions of the plurality of test-target mobiles MB1 600 and MB2 620.

Figure 8:
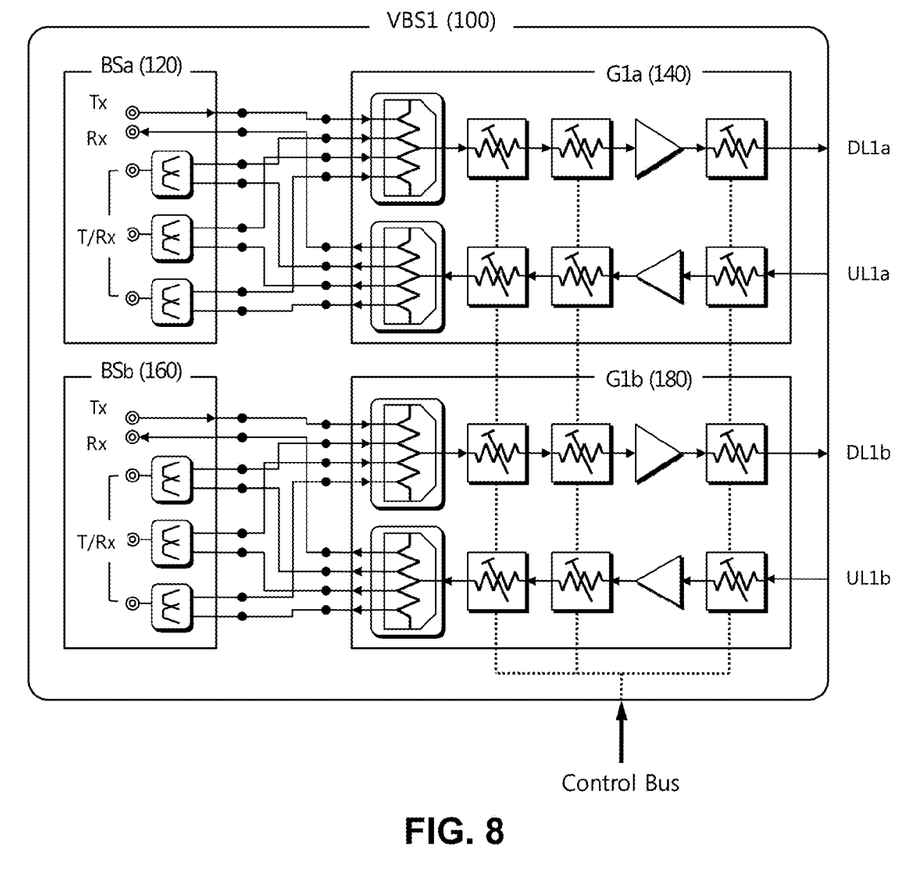
FIGS. 8 and 9 show a detailed constitution of a virtual base station according to the exemplary embodiment of the present invention.
Figure 9:
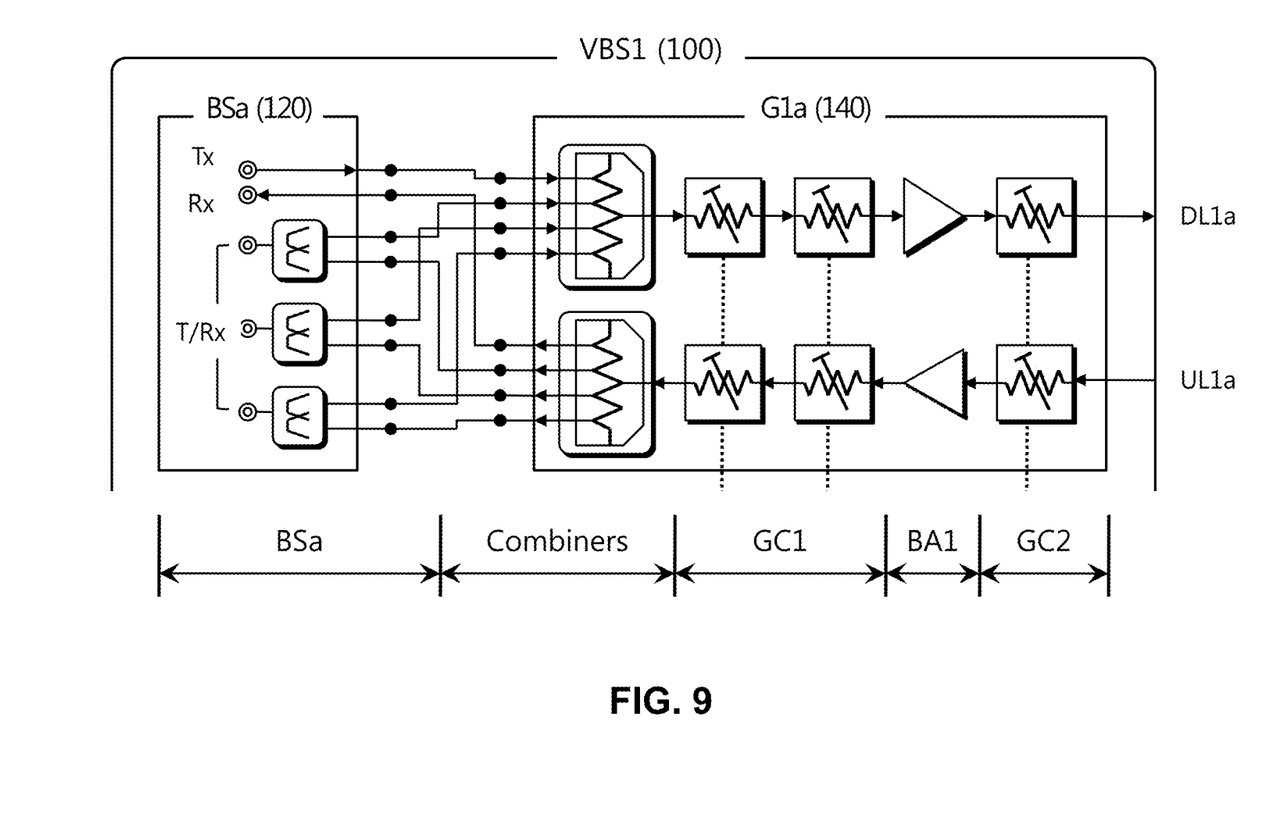

FIGS. 8 and 9 show a detailed constitution of the virtual base station VBS1 100 according to the exemplary embodiment of the present invention. As described above, the virtual base station VBS1 100 includes the base station device BSa 120, the base station gain controller G1a 140 which is connected to the base station device BSa 120 and sets UL and DL attenuation, the base station device BSb 160, and the base station gain controller G1b 180 which is connected to the base station device BSb 160 and sets UL and DL attenuation.

As shown in FIG. 8, the base station devices BSa 120 and BSb 160 are configured to support transmission and reception (T/Rx) of different types of version-specific networks, such as 2G GSM, 3G UMTS (W-CDMA), and 4G LTE, according to bands of 900 MHz, 1.8 GHz, and 2.1 GHz, and UL and DL RF signals of the base station devices BSa 120 and BSb 160 are connected to and combined by the base station gain controllers G1a 140 and G1b 180 using coaxial cables. Here, the base station devices BSa 120 and BSb 160 may include separate baseband Tx and Rx terminals to check transmission of baseband data.

Referring to FIG. 9, UL and DL RF signals of the base station devices BSa 120 and BSb 160 are provided to the base station gain controller G1a 140 through coaxial cables and combined by combiners of the base station gain controller G1a 140. The base station gain controller G1a 140 includes a plurality of gain adjusters GC1 and GC2 for controlling gain according to UL and DL paths. Here, the gain adjuster GC1 is configured by connecting at least two attenuation means in series to calculate distances from base stations to a mobile according to a location in a movement path d and provide radio wave environments which are in inverse proportion to the squares of the distances as described above with reference to FIG. 5 when the locations of the base stations on a map and a starting point SP and a destination point DP are determined. Also, a low-noise wideband buffer amplifier BA1 may be provided between the plurality of gain adjusters GC1 and GC2, so that influence of noise resulting from attenuation of an RF signal may be reduced.

Figure 10:
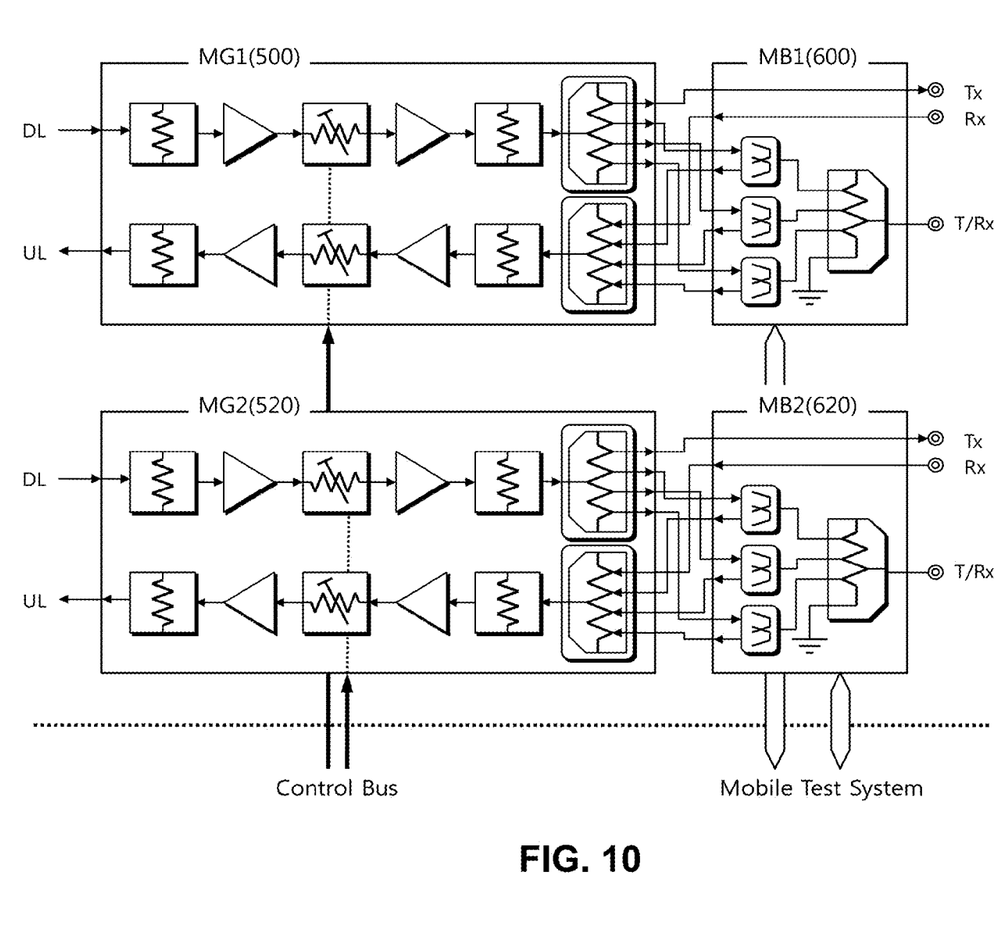
FIGS. 10 and 11 show detailed constitutions of a mobile gain control unit and a test-target mobile according to the exemplary embodiment of the present invention.
Figure 11:
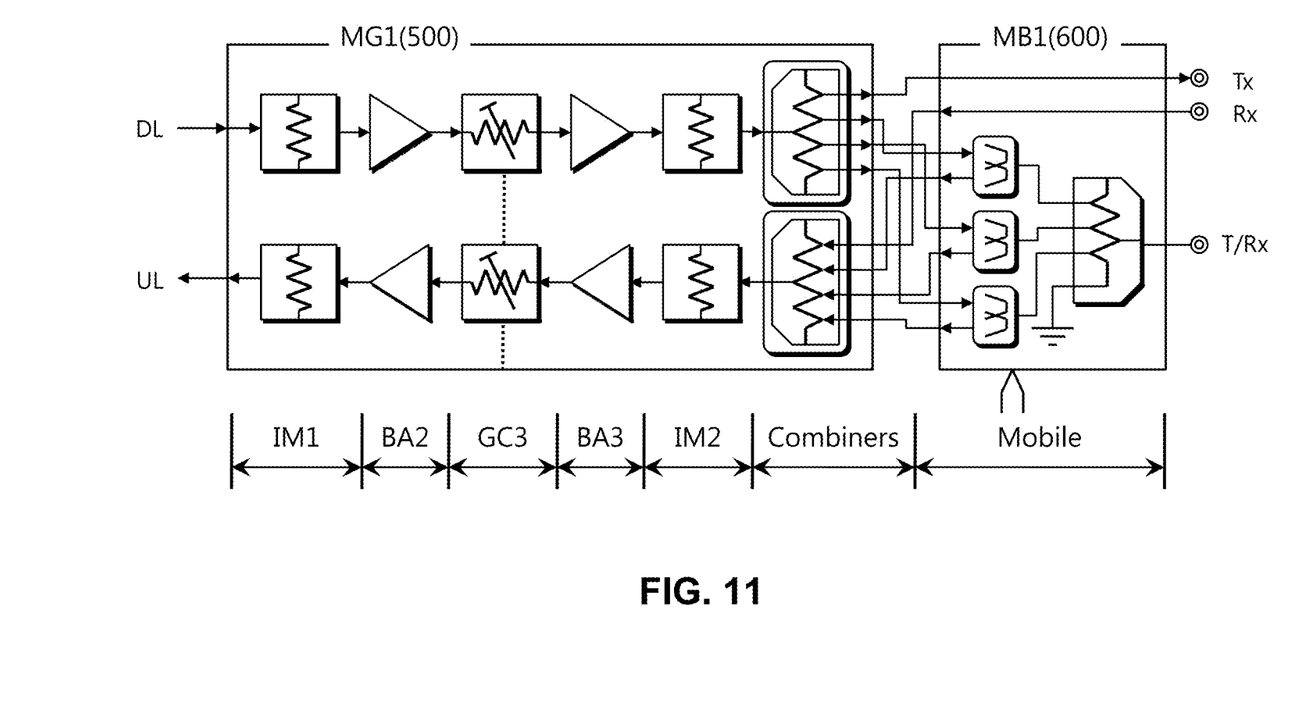

FIGS. 10 and 11 show detailed constitutions of a mobile gain control unit and a test-target mobile according to the exemplary embodiment of the present invention. UL and DL lines of the base station gain controller described above are connected to a mobile gain controller which controls attenuation dependent on environments of the plurality of test-target mobiles and the plurality of test-target mobiles whose UL and DL channels are connected to the gain controller. Here, all RF signals between the elements are connected through coaxial cables to prevent mutual interference and the introduction of external noise and to provide almost the same conditions as an actual environment.

Referring to FIG. 11, the DL line of the base station gain controller is connected to a gain adjuster GC3 of the mobile gain controller MG1 500 through a first impedance matcher IM1 and a low-noise wideband buffer amplifier BA2, so that attenuation dependent on environments of mobiles is controlled by the gain adjuster GC3. Here, control of attenuation dependent on environments of mobiles reflects attenuation caused by factors other than the distance from a base station, that is, the presence of a mobile in a building or a geographical condition of attenuation of an RF signal. The output of the gain adjuster GC3 passes through a low-noise wideband buffer amplifier BA3 and is provided to the mobile MB1 600 through a second impedance matcher IM2 and a combiner.

Along the UL line of the base station gain controller, an UL RF signal provided to a coaxial cable by the mobile MB1 600 passes through the low-noise wideband buffer amplifier BA3 via a combiner and the impedance matcher IM2, so that attenuation dependent on environments of mobiles is controlled by the gain adjuster GC3. The output of the gain adjuster GC3 passes through the low-noise wideband buffer amplifier BA2 and is uplinked via the first impedance matcher IM1.

The test-target mobile MB1 600 is connected to the mobile test system through the serial bus, and the mobile test system monitors base station connection states of the test-target mobiles and provides the scenario computer with handover information including the IDs of currently connected base stations.

Figure 12:
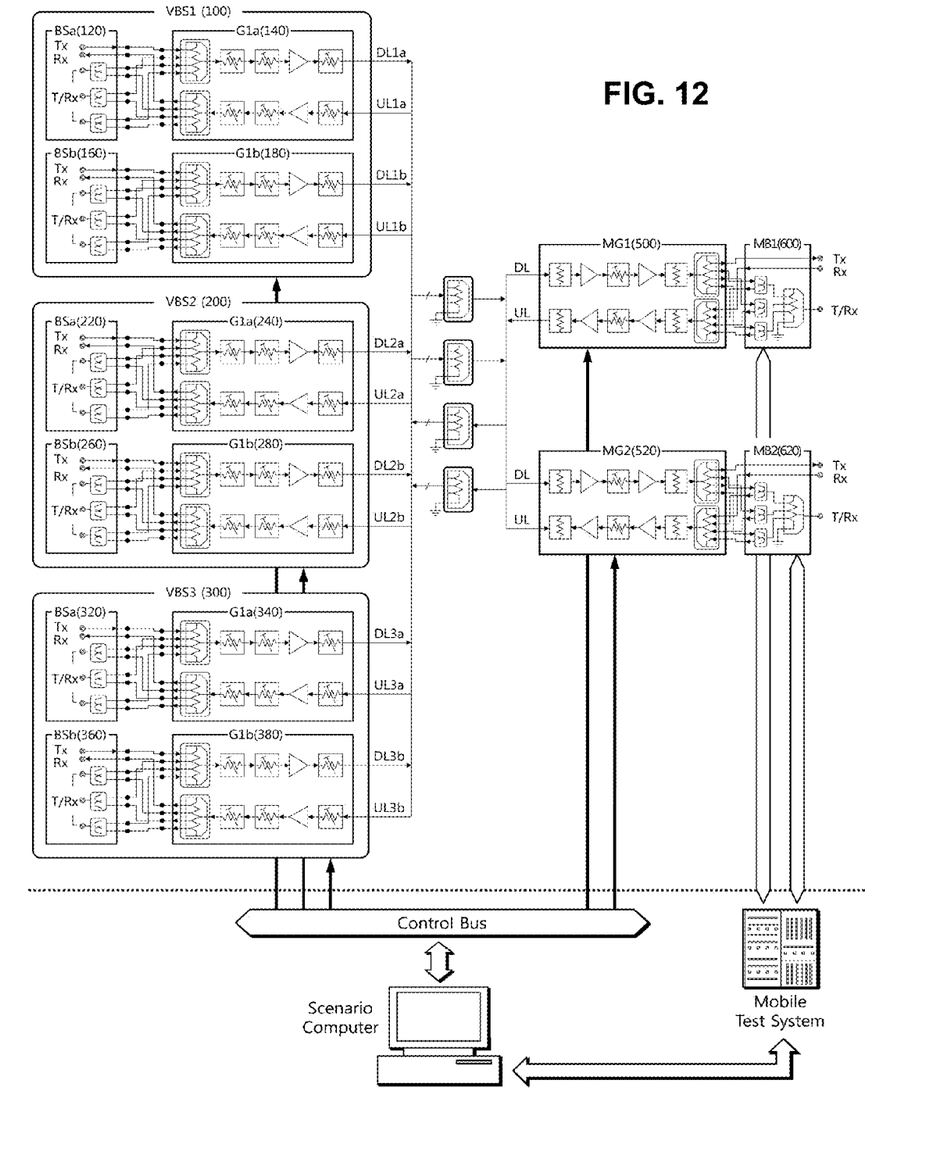
FIG. 12 shows a detailed overall constitution of the system for testing mobile handover according to the exemplary embodiment of the present invention.

FIG. 12 shows a detailed overall constitution of the system for testing mobile handover described above with reference to FIGS. 6 to 11 according to the exemplary embodiment of the present invention.

The system for testing mobile handover according to the exemplary embodiment of the present invention includes the plurality of virtual base stations VBS1 to VBS3 including at least three base stations and setting UL and DL attenuation for the base stations, the plurality of combiners DC1, DC2, UC1, and UC2 which combine UL and DL RF signals for the plurality of virtual base stations VBS1 to VBS3, the plurality of mobile gain controllers MG1 and MG2 which are connected to the plurality of combiners DC1, DC2, UC1, and UC2 and control UL and DL-specific gain or attenuation dependent on environments of the plurality of test-target mobiles MB1 and MB2, and the plurality of test-target mobiles MB1 and MB2 having UL and DL channels separately connected to the plurality of mobile gain controllers MG1 and MG2. Here, all RF signals between the elements are connected through coaxial cables to prevent mutual interference and the introduction of external noise and to provide conditions close to an actual base station environment.

As described above, a system for testing mobile handover according to an exemplary embodiment of the present invention makes it possible to test a handover operation on a mobile side by providing an actual base station with a radio wave environment for causing mobile devices to move. Also, the system for testing mobile handover according to an exemplary embodiment of the present invention makes it possible to test a handover operation of a mobile in homogeneous network and heterogeneous network environments.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. A system for testing mobile handover which makes it possible to test a handover operation on a mobile side by providing a base station with a radio wave environment for causing mobile devices to move, the system comprising:
   a plurality of virtual base stations including at least three base stations and configured to set uplink (UL) and downlink (DL) attenuation for the base stations;
   a plurality of combiners configured to combine UL and DL radio frequency (RF) signals for the plurality of virtual base stations;
   a plurality of mobile gain controllers connected to the plurality of combiners and configured to control UL and DL-specific gain or attenuation dependent on environments of a plurality of test-target mobiles; and
   wherein the plurality of test-target mobiles have UL and DL channels separately connected to the plurality of mobile gain controllers;
   wherein the plurality of virtual base stations comprise:
      i) a plurality of base station devices, and
      ii) a plurality of base station gain controllers connected to the plurality of base station devices and configured to set the UL and DL attenuation; and
   wherein the plurality of base station gain controllers includes a plurality of gain adjusters for controlling gain according to UL and DL paths.

2. The system of claim 1, wherein setting of UL and DL attenuation by the plurality of virtual base stations and control of UL and DL-specific gain or attenuation by the plurality of mobile gain controllers are performed by a scenario computer connected through a control bus,
   the plurality of test-target mobiles are connected to a mobile test system through a serial bus, and
   the mobile test system is configured to monitor base station connection states of the plurality of test-target mobiles and provide the scenario computer with handover information including identifiers (IDs) of currently connected base stations.

3. The system of claim 1, wherein each of the plurality of base station devices is provided with and connected to one of a base station gain controller in the plurality of base station gain controllers.

4. The system of claim 1, wherein the scenario computer is configured to control the UL RF signals received from the plurality of test-target mobiles, the DL RF signals transmitted to the plurality of test-target mobiles, and the UL and DL-specific gain or attenuation of the plurality of test-target mobiles using the plurality of mobile gain controllers according to locations in movement paths based on locations of the plurality of virtual base stations and starting points and destination points of the plurality of test-target mobiles, receive base station connection states of the plurality of test-target mobiles from a mobile test system, and test a handover operation on the mobile side.

5. The system of claim 1, wherein the plurality of virtual base stations further comprise:
   a combiner for combining the UL and DL RF signals of the plurality of base station gain controllers.

6. The system of claim 5, wherein the plurality of base station devices support transmission and reception (T/Rx) of a plurality of different types of networks, and the UL and DL RF signals of the plurality of base station devices are configured to be connected to and combined by the plurality of base station gain controllers using coaxial cables.

7. The system of claim 5, wherein the plurality of pain adjusters is configured by connecting at least two attenuation means in series; and a low-noise wideband buffer amplifier between the plurality of gain adjusters.

8. The system of claim 5, wherein DL lines of the plurality of base station gain controllers are connected to gain adjusters of the plurality of mobile gain controllers through first impedance matchers and first low-noise wideband buffer amplifiers of the plurality of mobile gain controllers, so that the attenuation dependent on environments of the plurality of mobiles is controlled by the gain adjusters, and outputs of the gain adjusters pass through second low-noise wideband buffer amplifiers and are provided to the plurality of test-target mobiles via second impedance matchers and combiners.

9. The system of claim 8, wherein, along UL lines of the plurality of base station gain controllers, the UL RF signals provided to the coaxial cables by the plurality of test-target mobiles pass through the second low-noise wideband buffer amplifiers of the plurality of mobile gain controllers via combiners and the second impedance matchers, so that the attenuation dependent on environments of the plurality of mobiles is controlled by the gain adjusters, and outputs of the gain adjusters pass through the first low-noise wideband buffer amplifiers and are uplinked via the first impedance matchers.

* * * * *